United States Patent
Li et al.

(10) Patent No.: US 8,539,461 B2
(45) Date of Patent: Sep. 17, 2013

(54) METHOD FOR IDENTIFYING MEMORY OF VIRTUAL MACHINE AND COMPUTER SYSTEM THEREOF

(75) Inventors: Han-Lin Li, Taoyuan County (TW); Jui-Hao Chiang, Taipei (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 118 days.

(21) Appl. No.: 13/337,301

(22) Filed: Dec. 27, 2011

(65) Prior Publication Data

US 2013/0097357 A1 Apr. 18, 2013

Related U.S. Application Data

(60) Provisional application No. 61/548,697, filed on Oct. 18, 2011.

(30) Foreign Application Priority Data

Nov. 30, 2011 (TW) .............................. 100143979 A

(51) Int. Cl.
*G06F 9/45* (2006.01)

(52) U.S. Cl.
USPC ................................ 717/140; 717/148; 711/6

(58) Field of Classification Search
USPC ..................... 717/140, 148; 711/6; 718/100
See application file for complete search history.

(56) References Cited

U.S. PATENT DOCUMENTS

| | | | |
|---|---|---|---|
| 6,862,650 B1 * | 3/2005 | Matthews et al. ................. | 711/6 |
| 7,421,533 B2 * | 9/2008 | Zimmer et al. .................... | 711/6 |
| 7,500,048 B1 * | 3/2009 | Venkitachalam et al. ........ | 711/6 |
| 7,603,344 B2 | 10/2009 | Bousquet et al. | |
| 7,702,843 B1 | 4/2010 | Chen et al. | |
| 7,814,287 B2 * | 10/2010 | Pratt ............................. | 711/163 |
| 7,865,493 B2 | 1/2011 | Kim et al. | |
| 7,996,833 B2 * | 8/2011 | de Dinechin et al. ............ | 718/1 |
| 8,011,010 B2 | 8/2011 | Michael et al. | |
| 8,090,938 B2 * | 1/2012 | Xu ................................ | 713/100 |
| 8,276,201 B2 * | 9/2012 | Schunter et al. ................ | 726/22 |
| 2007/0261120 A1 | 11/2007 | Arbaugh et al. | |
| 2013/0086299 A1 * | 4/2013 | Epstein ............................ | 711/6 |

OTHER PUBLICATIONS

Soltesz et al., "Virtual Deppelganger: On the performance, Isolation, and Scalability of Para- and Paene-Virtualized Systems", 2006.*

(Continued)

*Primary Examiner* — Phillip H Nguyen
(74) *Attorney, Agent, or Firm* — Jianq Chyun IP Office

(57) ABSTRACT

A method for identifying memories of virtual machines is provided. The method is adapted to a computer system executing at least one virtual machine, and an operating system is executed on the virtual machine. The method includes the following steps. A kernel file of the operating system is obtained, and the kernel file includes version information of the operation system. A source code and a configuration file of the operating system are obtained according to the version information, and the versions of the source code and the configuration file are complied with the version of the operating system. An object file is generated by compiling a fixed interface function with the source code according to the configuration file. Memory pages of the virtual machine are identified according to the object file. Furthermore, a computer system using the foregoing method is also provided.

12 Claims, 3 Drawing Sheets

(56) References Cited

OTHER PUBLICATIONS

Tal Garfinkel et al., "A Virtual Machine Introspection Based Architecture for Intrusion Detection", On Proc. Network and Distributed Systems Security Symposium, 2003, p. 191-206.

Artem Dinaburg et al., "Ether: Malware Analysis via Hardware Virtualization Extensions", Proceedings of the 15th ACM conference on computer and communications security, Oct. 27-31, 2008, p. 1-12.

Andrew Case et al., "FACE: Automated digital evidence discovery and correlation", digital investigation 5, 2008, p. S65-S75.

Mariusz Burdach, "Finding Digital Evidence in Physical Memory", Black Hat Federal, 2008, p. 1-49.

"VM Resource Manager (VMRM) Cooperative Memory Management" from version 5, release 2, modification 0 of IBM z/VM (product No. 5741-A05), retrieved from http://www.vm.ibm.com/sysman/vmrm/vmrmcmm.html, Third Edition (May 2006), p. 1-293.

Bryan D. Payne et al., "Secure and Flexible Monitoring of Virtual Machines", Computer Security Applications Conference, 2007. ACSAC 2007. Twenty-Third Annual, Dec. 10-14, 2007, p. 385-397.

Jason Solomon et al., "User data persistence in physical memory", digital investigation 4, Jun. 2007, p. 68-72.

Dolan-Gavitt, B. et al., "Virtuoso: Narrowing the Semantic Gap in Virtual Machine Introspection", Security and Privacy (SP), 2011 IEEE Symposium, Issue Date: May 22-25, 2011, p. 297-312.

\* cited by examiner

```
01
02  Int GFN_is_Buddy(unsigned long GFN)
03  {
04      Struct page *page;
05  #ifdef CONFIG_FLATMEM
06      /* Flat memory model*/
07      page = (struct page*)mem_map[GFN];
08      return PageBuddy(page);
09  #else...
10  #endif
11  }
```

```
01  /* FreePageCheck.c */
02  extern int GFN_is_Buddy(unsigned long);
03  void check_free_page(int *free_map)
04  {
05      for(gfn = 0; gfn < guest_max_gfn; gfn++)
06      {
07          If(GFN_is_Buddy(gfn))
08              .../*Mark free page*/
09      }
10  }
```

METHOD FOR IDENTIFYING MEMORY OF VIRTUAL MACHINE AND COMPUTER SYSTEM THEREOF

This application claims the priority benefits of U.S. provisional application Ser. No. 61/548,697, filed on Oct. 18, 2011 and Taiwan application serial no. 100143979, filed on Nov. 30, 2011. The entirety of each of the above-mentioned patent applications is hereby incorporated by reference herein and made a part of this specification.

BACKGROUND OF THE DISCLOSURE

1. Field of the Disclosure

The disclosure relates to a method for identifying memories of virtual machines that is suitable for various versions of an operating system and a computer system using the same.

2. Description of Related Art

As computer hardware cost decreases and demand for large-scale server increases, virtual machines gradually draw attentions. The virtual machine is an interface used between software and a computer system, which may provide various resources of the computer system to the software for utilization. The software is generally an operating system. Therefore, the operating system can access the resources of the computer system through the virtual machine. However, a plurality of virtual machines can be installed on the computer system, and each of the virtual machines may install different operating system. For example, the Windows operating system of Microsoft and the Linux operating system can be simultaneously installed in different virtual machines on a same computer system.

Since a coupling relationship between the operating system on the virtual machine and the computer system is loosed, and the operating system manages memory pages on the virtual machines, a virtual machine monitor (VMM) on the computer system is not easy to obtain usage states of the memory pages on the virtual machines. However, in some applications, accessing of the memory pages on the virtual machines is necessary. For example, when the memory pages of different virtual machines are shared, it is required to detect the usage states of the memory pages, or when it is determined whether the operating system is invaded by viruses, it is required to reliably identify data structures in the memory pages from a virtual machine level. One method is to write data structure information of the operating system to the VMM, and analyze the memory pages on the virtual machines according to the data structure information. However, when the version of the operating system is updated or the compile configuration of guest OS is changed, the data structure information of the operating system has to be manually updated which is time consuming. Therefore, it is required to develop a method for identifying memories of virtual machines that is suitable for various versions of the operating system.

SUMMARY OF THE DISCLOSURE

The disclosure is directed to a method for identifying memories of virtual machines, which is suitable for various operating systems.

The disclosure is directed to a computer system, which is capable of identifying memories of virtual machines and is suitable for various operating systems.

The disclosure provides a method for identifying memories of virtual machines. This method is adapted to a computer system executing at least one virtual machine, and an operating system is executed on the at least one virtual machine. The method includes following steps. A kernel file of the operating system is obtained, and the kernel file includes version information of the operating system. At least one source code and a configuration file of the operating system are obtained according to the version information, and versions of the source code and the configuration file are complied with a version of the operating system. At least one object file is generated by compiling a fixed interface function with the source code according to the configuration file. Memory pages on the virtual machine are identified according to the object file.

According to another aspect, the disclosure provides a computer system, which is adapted to execute at least one virtual machine, and an operating system is executed on the virtual machine. The computer system includes a memory unit, an operating system version control unit and a processing unit. The memory unit includes a plurality of physical memory pages. The operating system version control unit is coupled to the memory unit for obtaining a kernel file of the operating system. The kernel file includes version information of the operating system. Moreover, the operating system version control unit obtains at least one source code and a configuration file of the operating system according to the version information. The operating system version control unit compiles a fixed interface function with the source code and the configuration file obtained from version information to generate at least one object file. The processing unit is coupled to the memory unit and the operating system version control unit for identifying memory pages on the virtual machine according to the object file.

According to the above descriptions, the disclosure provides a method for identifying memories of virtual machines and a computer system. In this method, the source code and the configuration file are obtained according to the version of the operating system, and the source code is compiled with the fixed interface function according to the configuration file. Accordingly, the generated object file has the data structure information of the current operating system. In this way, the disclosure is adapted to operating systems of different versions, and is suitable for identifying the memory pages on the virtual machines.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 5 illustrates program codes of a fixed interface function 440 according to an embodiment of the disclosure.

FIG. 6 illustrates program codes of a sub program 480 according to an embodiment of the disclosure.

DETAILED DESCRIPTION OF DISCLOSED EMBODIMENTS

Figure 1:
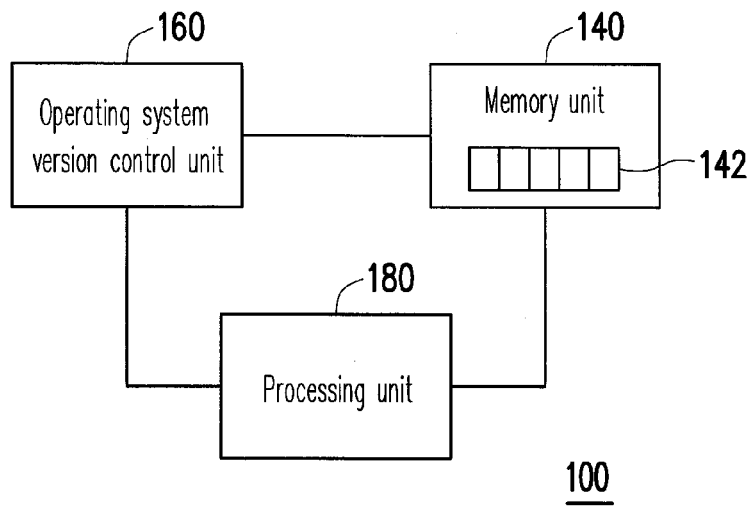
FIG. 1 is a block diagram of a computer system according to an embodiment of the disclosure.

FIG. 1 is a block diagram of a computer system according to an embodiment of the disclosure.

Referring to FIG. 1, the computer system 100 includes a memory unit 140, an operating system version control unit 160 and a processing unit 180.

The memory unit 140 includes a plurality of physical memory pages 142. The memory unit 140 is, for example, a dynamic random access memory (DRAM) or a static random access memory (SRAM).

The operating system version control unit 160 is coupled to the memory unit 140 for obtaining version information of the operating system and generating a file suitable for various versions of the operating system. The operating system version control unit 160 is, for example, a microprocessor, which is used for executing program codes in a non-volatile memory (not shown).

The processing unit 180 is coupled to the operating system version control unit 160 and the memory unit 140, and is used for executing software and firmware on the computer system 100 and identifying memory pages of virtual machines executed on the computer system 100 according to the file generated by the operating system version control unit 160. The processing unit 180 is, for example, a central processing unit (CPU).

Figure 2:
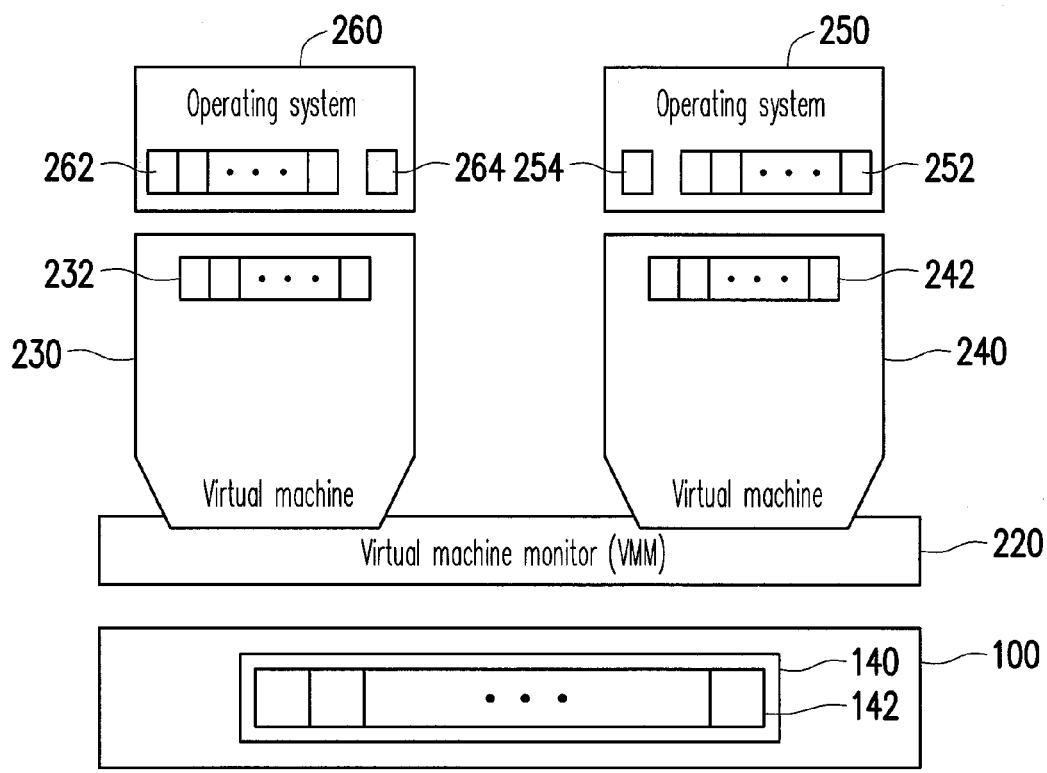
FIG. 2 is a schematic diagram illustrating a computer system and virtual machines according to an embodiment of the disclosure.

In the present embodiment, two virtual machines are executed on the computer system 100, and each of the virtual machines executes an operating system. Referring to FIG. 2, FIG. 2 is a schematic diagram illustrating a computer system and virtual machines according to an embodiment of the disclosure. A virtual machine monitor (VMM) 200 is executed on the computer system 100 for controlling all resources of the computer system 100. The resources of the computer system 100 include the processing unit 120, the memory unit 140 and input output (IO) devices (not shown) on the computer system 100. In the present embodiment, the VMM 200 constructs a virtual machine 230 and a virtual machine 240. The virtual machine 230 and the virtual machine 240 can access the aforementioned resources of the computer system 100 through the VMM 220. However, the VMM 220 can provide more or less number of the virtual machines, and the disclosure is not limited to the number of the machines mentioned in the present embodiment.

The VMM 220 can allocate the resources of the computer system 100 to the virtual machine 230 and the virtual machine 240. Taking the memory as an example, the VMM 220 allocates the physical memory pages 142 in the memory unit 140 to the virtual machine 230 and the virtual machine 240, so that the virtual machine 230 includes a plurality of memory pages 232, and the virtual machine 240 includes a plurality of memory pages 242. It should be noticed that the memory pages 232 and the memory pages 242 are guest physical memories, i.e. the memory pages 232 and the memory pages 242 are not physical memories, but are only virtual memories corresponding to the physical memory pages 142.

On the other hand, an operating system 260 is installed on the virtual machine 230, and an operating system 250 is installed on the virtual machine 240. In this way, the operating system 260 can access the resources (for example, the memory pages 232) on the virtual machine 230, and the operating system 250 can access the resources (for example, the memory pages 242) on the virtual machine 240. The operating system 260 also includes a plurality of virtual memory pages 262, and the operating system 260 uses a logical address to access the virtual memory pages 262. When the operating system 260 uses the logical address to access the virtual memory pages 262, the operating system 260 transforms the logical address to a guest physical address of the memory pages 232, and the VMM 220 transforms the guest physical address to a physical address of the physical memory pages 142. The operating system 260 accesses the physical memory pages 142 through the above transformation relationship. The operating system 250 can also use logical addresses to access the physical memory pages 142 through similar transformations, which is not repeated herein.

A memory map 264 in the operating system 260 stores usage states of the memory pages 232. In an embodiment, the operating system 260 is a Linux operating system, and the Linux operating system has two memory models of a flat memory model and a sparse memory model, and different methods are used to manage the memory pages 232 under different models. Under the flat memory model, the memory map 264 is named as mem_map, and represents a data structure arranged in an array, where an element in the array corresponds to one of the memory pages 232, and the element includes the usage state of the corresponding memory page. Under the sparse memory model, the operating system 260 includes a plurality of memory sections, and each of the memory sections has a corresponding memory map 264. Each of the memory sections is independent, and information of each of the memory sections is stored in an array named mem_section. After a kernel of the operating system 260 is compiled, the aforementioned memory model is determined and is not changed, and information related to the memory model is stored in a configuration file (for example, a .config file). In an embodiment, the operating system 260 uses the flat memory model, and the operating system 250 uses the sparse memory model, so that the data structure of the memory map 264 and the data structure of the memory map 254 are different. In this way, the VMM 220 is required to read the aforementioned configuration file to obtain the information of the memory model.

In another embodiment, the operating system 250 and the operating system 260 are all the Linux operating system, and use the same memory model (for example, the flat memory model). Therefore, the data structure of the memory map 264 and the data structure of the memory map 254 are the same. However, as a version of the operating system 250 and a version of the operating system 260 are different, a meaning of a field value in each element of the memory map 254 is not completely the same to a meaning of a field value in each element of the memory map 264. In detail, the Linux operating system uses a buddy system algorithm to manage free memory pages. Here, the free memory pages are referred to as free pages. In order to avoid discontinuity of memory addresses of the free pages, the consecutive free pages are grouped into one group, and a size of the group is a power of 2 (for example, 32 or 64). A first memory page of each group is a buddy page, and a field named "private" is used to store information of the group size. For example, if a value of the field "private" in the buddy page of one group is n, it represents that this group includes $2^n$ consecutive free pages. Therefore, the VMM 22 can obtain the data structure of the memory free pages of the operating system by identifying the buddy page of each of the groups. However, if the version of the Linux operating system is different, different fields have to be read to identify whether a memory page is the buddy page. For example, the memory map 254 is the aforementioned array data structure mem_map, and one element in the array corresponds to one memory page 242, and in order to determine whether the memory page is the buddy page, data stored in the corresponding element is inquired. In a version of the Linux operating system older than a version 2.6.18, if a $19^{th}$ bit of a field "flags" in the element is 1, the memory page is the buddy page. However, in a version 2.6.38, another field named "_mapcount" in the element has to be inquired to determine whether the memory page is the buddy page.

In an embodiment, the operating system 260 and the operating system 250 are all the Windows operating system, and in the Windows operating system, the free memory pages are stored according to a page list named "Zeroed". The memory map 264 is a page frame number (PFN) database. The PFN database has an data structure arranged in an array, and each element of the array includes a "Type" field for recording a usage state of the corresponding memory page 232, namely, the "Type" field records whether the memory page is put into the page list Zeroed. However, in different versions of the Windows operating system, data storage methods of the "Type" field are not completely the same. Therefore, the VMM 22 must have the version information of the operating system in order to analyze the "Type" field, so as to identify the memory pages on the virtual machines.

In brief, when the memory models set in the operating system 260 and the operating system 250 are different, the data structures of the memory map 264 and the memory map 254 are different. Even if the data structures of the memory map 264 and the memory map 254 are the same, when the versions of the operating system 260 and the operating system 250 are different, different methods have to be used to read field information of the memory map 264 and the memory map 254 to identify the memory pages 232 and the memory pages 242.

However, in the Linux operating systems of different versions, a function named int PageBuddy(struct page*) is provided, and an input of such function is a pointer of a data structure "struct page", where the data structure "struct page" stores information of the corresponding memory page, namely, the input of the function is a pointer of an element in the memory map. An output of the function is an integer representing whether the corresponding memory page is the buddy page. In different versions of the Linux operating system, the provided functions all have the same interface, though implementations thereof are different. In the present embodiment, the memory pages on the virtual machines are identified based on the characteristic that the function has the same interface in different versions of the operating system. It should be noticed that the type of the operating system (for example, Linux or Windows) and the used function are not limited by the disclosure, and other fixed interface functions of the operating system can also be used to identify the memory pages of the virtual machines without departing from the spirit and scope of the disclosure.

Figure 3:
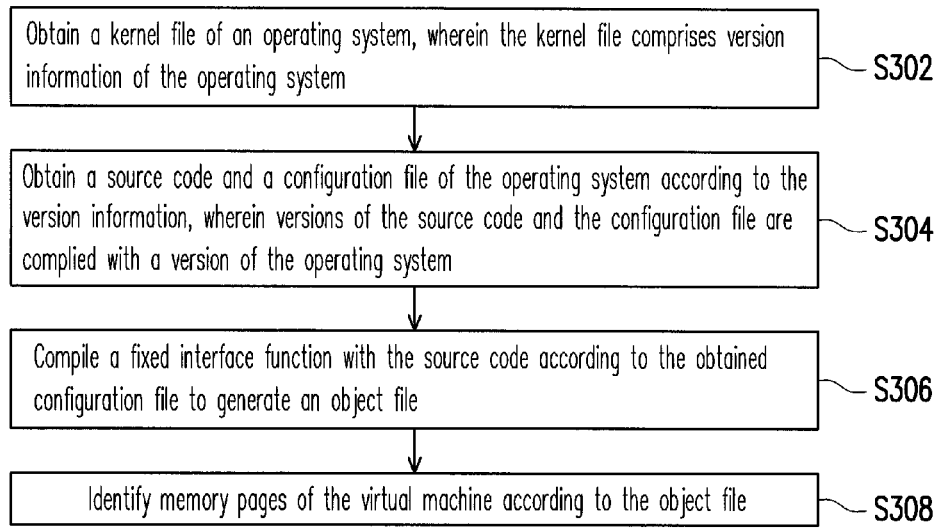
FIG. 3 is a flowchart illustrating a method for identifying memories according to an embodiment of the disclosure.

FIG. 3 is a flowchart illustrating a method for identifying memories according to an embodiment of the disclosure. Referring to FIG. 1 and FIG. 3, the operating system 260 is taken as an example to describe a flow for identifying the memory pages 232.

In step S302, the operating system version control unit 160 obtains a kernel file of the operating system, where the kernel file includes version information of the operating system. For example, the kernel file of the Linux operating system 260 is a kernel image file named vmlinux, and the kernel image file includes two parts of a real-mode kernel image file and a protected-mode kernel image file, where the real-mode kernel image file includes the version information of the operating system 260. In detail, since headers of the real-mode kernel image files of different versions of the Linux operating system all contain a magic number with a content of "HdrS", the operating system version control unit 160 can search each of the memory pages 232 to find the real-mode kernel image file containing the magic number, so as to obtain the version information of the operating system 260. However, the method of obtaining the kernel file of the operating system is not limited by the disclosure.

In step S304, the operating system version control unit 160 obtains source codes and a configuration file (for example, the .config file) of the operating system 260 according to the version information of the operating system 260, where versions of the source codes and the configuration file are complied with a version of the operating system 260. The obtained source codes include implementation program codes of various functions complied with the version of the operating system 260, and the configuration file includes the memory model of the operating system 260 and the memory address information of the memory map 264. In an embodiment, the operating system 260 is the Linux operating system, and after the operating system version control unit 160 obtains the version information of the Linux operating system 260, the operating system version control unit 160 can download the source codes and the configuration file corresponding to the version of the operating system from a website named CentOS, where the configuration file is a file named "config-[version number]". In other embodiments, the operating system version control unit 160 can be connected to a server through a local area network to download the source codes and the configuration file of the operating system, and the method of obtaining the source codes and the configuration file is not limited by the disclosure. On the other hand, the versions of the downloaded source codes and the configuration file are complied with the version of the operating system 260, namely, the downloaded source codes include function implementation program codes complied with the version of the operating system 260 and named int PageBuddy(struct page*).

Figure 4:
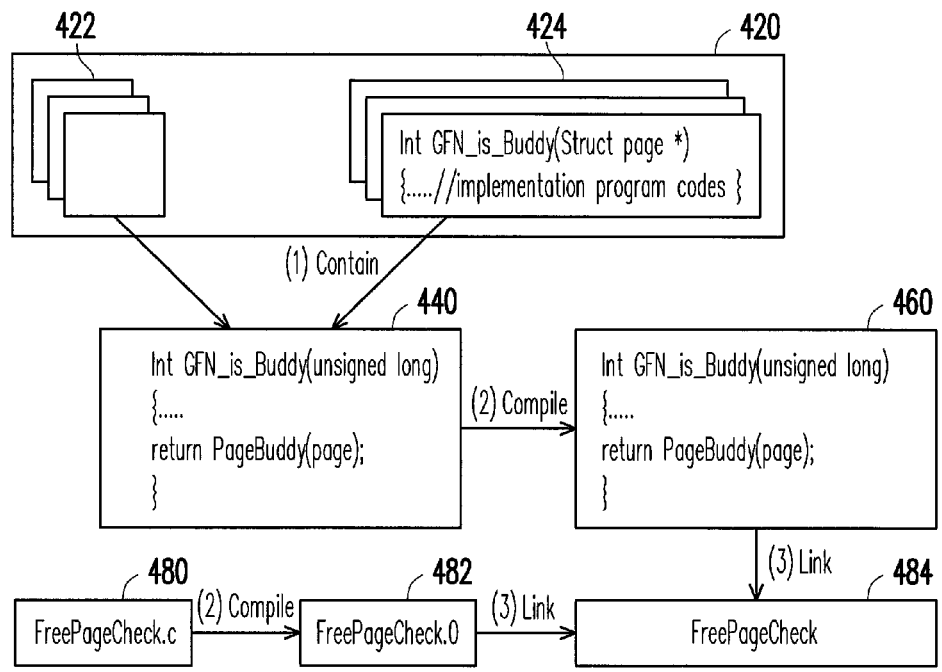
FIG. 4 is a schematic diagram of a compiling flow of an object file suitable for various versions of an operating system according to an embodiment of the disclosure.

In step S306, the operating system version control unit 160 compiles a fixed interface function with the source codes according to the obtained configuration file to generate an object file. Referring to FIG. 4 for detailed descriptions, FIG. 4 is a schematic diagram of a compiling flow of the object file suitable for various versions of an operating system according to an embodiment of the disclosure. In the step S304, the operating system version control unit 160 obtains the source codes 420 of the operating system 260, where the source codes 420 include a head file 422 and implementation program codes 424. The head file 422 includes an interface and declaration of each function and includes a declaration of a the function int PageBuddy(struct page*). The implementation program codes 424 include implementation program codes of various functions, which also include the implementation program codes of the function int PageBuddy(struct page*). A fixed interface function 440 is a function named int GFN_is_Buddy (unsigned long), in which the function int PageBuddy (struct page*) is called, and the fixed interface function 440 may have other names, which is not limited by the disclosure. The operating system version control unit 160 compiles the fixed interface function 440, the head file 422 and the source codes 424 to generate an object file 460, where the object file 460 includes the fixed interface function 440. Moreover, when the operating system version control unit 160 compiles the fixed interface function 440, the head file 422 and the source codes 424, the configuration file (the .config file of the operating system 260) obtained according to the step S304 is referred. Referring to FIG. 5, FIG. 5 illustrates program codes of the fixed interface function 440 according to an embodiment of the disclosure. The program codes of a 5$^{th}$ row of the fixed interface function 440 are used to determine whether the memory model of the operating system 260 is the flat memory model, and now the configuration file (i.e., the .config file) of the operating system 260 is referred, where the configuration file includes information related to the memory model of the operating system 260.

Referring to FIG. 4, after the operating system version control unit 160 generates the object file 460, since the fixed interface function 440 calls the function int PageBuddy(struct page*), the object file 460 also includes the implementation program codes of the function int PageBuddy(struct page*), and naming of the function in the object file 460 is the same to that of the fixed interface function 440. It should be noticed that the implementation program codes 424 depend on the version of the operating system 260, namely, the implementation program codes 424 contain program codes for identifying the memory map 264. In this way, the generated object file 460 is also complied with the version of the operating system 260, and can be used to identify the memory map 264. On the other hand, the name of the fixed interface function 440 is not changed after determination, so that if the version of the operating system is changed, as long as the aforementioned step are used to recompile the object file 460, the name of the function in the object file 460 is not changed, though the implementation program codes of a different version of the operating system are included. Therefore, the memory pages of the virtual machines of different operating system versions can be identified without manually adjusting any program code.

In step S308, the processing unit 180 identifies the memory pages on the operating system according to the object file. Taking the operating system 260 as an example, the processing unit 180 calls the function int GFN_is_Buddy(unsigned long) in the object file 460 to identify the memory pages 232 on the virtual machine 230. Namely, the processing unit 180 can execute a program to call the function int GFN_is_Buddy (unsigned long) in the object file 460 to identify the memory pages 232.

For example, a sub program 480 calls the function of the object file 460 to determine whether one of the memory pages 232 is a buddy page. If yes, the memory pages in the group containing the buddy page are marked as free pages. Referring to FIG. 6 for a content of the sub program 480, FIG. 6 illustrates program codes of the sub program 480 according to an embodiment of the disclosure. A 7$^{th}$ row of the sub program 480 calls the function int GFN_is_Buddy (unsigned long), and after the sub program 480 is compiled, a sub program object file 482 is generated. On the other hand, a main execution file 484 includes a function named int main( ) in which the function int GFN_is_Buddy (unsigned long) of the sub program 480 is called. Besides, the main execution file 484 further includes information of the memory map 264, so that when the processing unit 180 executes the main execution file 484, the processing unit 180 can identify the memory pages 232 according to the memory map 264 and the object file 460. In detail, in the step S306, the processing unit 180 compiles the configuration file with the source codes to obtain a file System.map. The processing 180 obtains a symbol table from the file System.map, and obtains a memory address of the memory map 264 from the symbol table, and then obtains the memory map 264 according to the memory address. The main execution file 484 further includes program codes for scanning all of the memory pages 232 according to the information of the memory map 264 and determining whether the memory page is the buddy page according to the object file 460. When the processing unit 180 compiles the main execution file 484, the sub program object file 482 and the object file 460 are linked. When the processing unit 180 executes the main execution file 484, the processing unit 180 can identify the memory pages 232 and obtain the data structure of the memory pages 232.

However, in other embodiments, the main execution file 484 can call the function in the object file 460 only without calling the sub program object file 482, and the method that the processing unit 180 identifies the memory pages 232 according to the object file 460 is not limited by the disclosure.

On the other hand, in other embodiments, the source codes obtained according to the step S304 may include a plurality of files (for example, a plurality of .c files). Therefore, the object file generated according to the step S306 also includes a plurality of files (for example, a plurality of .o files). The numbers of the source codes and the object files are not limited by the disclosure.

Although the operating system 260 is taken as an example for descriptions, the aforementioned steps can also be used to generate an object file corresponding to the operating system 250, and the memory pages 242 in the virtual machine 240 can be identified according to the object file. Details thereof are as that described above, which are not repeated.

In summary, according to the method for identifying memories of virtual machines of the disclosure, the corresponding source code is obtained according to the version of the operating system of the computer system, so that the generated object file contains the version information of the current operating system, and the name of the function in the object file is fixed. Therefore, when the version of the operating system is changed, as long as the object file is regenerated, the same function name can be called, so as to identify the memory pages of the virtual machines under the current version of the operating system. Namely, in case of different versions of the operating system or when the version of the operating system is changed, it is unnecessary to manually adjust any program code.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for identifying memories of virtual machines, adapted to a computer system executing at least one virtual machine, wherein an operating system is executed on the at least one virtual machine, and the method for identifying memories of virtual machines comprising:

obtaining a kernel file of the operating system, wherein the kernel file comprises version information of the operating system;

obtaining at least one source code and a configuration file of the operating system according to the version information, wherein versions of the at least one source code and the configuration file are complied with a version of the operating system;

compiling a fixed interface function with the at least one source code according to the configuration file to generate at least one object file; and identifying memory pages of the at least one virtual machine according to the at least one object file.

2. The method for identifying memories of virtual machines as claimed in claim 1, wherein the step of obtaining the kernel file of the operating system comprises:
obtaining the kernel file by finding a magic number in the memory pages of the at least one virtual machine.

3. The method for identifying memories of virtual machines as claimed in claim 1, wherein the step of obtaining the at least one source code and the configuration file of the operating system according to the version information comprises:
downloading the at least one source code and the configuration file complied with the version of the operating system from a website according to the version information.

4. The method for identifying memories of virtual machines as claimed in claim 1, further comprising:
obtaining a memory address of a memory map of the operating system from the configuration file, wherein the memory map contains usage states of the memory pages of the at least one virtual machine; and
obtaining the memory map according to the memory address of the memory map.

5. The method for identifying memories of virtual machines as claimed in claim 4, wherein the step of identifying the memory pages of the at least one virtual machine according to the at least one object file comprises:
identifying the memory pages of the at least one virtual machine according to the memory map and the at least one object file, and obtaining a data structure of the memory pages.

6. The method for identifying memories of virtual machines as claimed in claim 1, wherein the operating system is a Linux operating system, and the fixed interface function comprises an int PageBuddy(struct page*) function of the operating system.

7. A computer system, adapted to execute at least one virtual machine, wherein an operating system is executed on the at least one virtual machine, and the computer system comprising:
a memory unit, comprising a plurality of physical memory pages;
an operating system version control unit, coupled to the memory unit; and
a processing unit, coupled to the memory unit and the operating system version control unit,
wherein the operating system version control unit obtains a kernel file of the operating system, wherein the kernel file comprises version information of the operating system, and obtains at least one source code and a configuration file of the operating system according to the version information, wherein versions of the at least one source code and the configuration file are complied with a version of the operating system, and compiles a fixed interface function with the at least one source code according to the configuration file to generate at least one object file, and the processing unit identifies memory pages on the at least one virtual machine according to the at least one object file.

8. The computer system as claimed in claim 7, wherein when the kernel file of the operating system is obtained, the operating system version control unit obtains the kernel file by finding a magic number in the memory pages of the at least one virtual machine.

9. The computer system as claimed in claim 7, wherein when the at least one source code and the configuration file of the operating system are obtained according to the version information, the operating system version control unit downloads the at least one source code and the configuration file complied with the version of the operating system from a website according to the version information.

10. The computer system as claimed in claim 7, wherein the processing unit further obtains a memory address of a memory map of the operating system from the configuration file, wherein the memory map contains usage states of the memory pages of the at least one virtual machine, and the processing unit obtains the memory map according to the memory address of the memory map.

11. The computer system as claimed in claim 10, wherein when the memory pages of the at least one virtual machine are identified according to the at least one object file, the processing unit identifies the memory pages of the at least one virtual machine according to the memory map and the at least one object file, and obtains a data structure of the memory pages.

12. The computer system as claimed in claim 7, wherein the operating system is a Linux operating system, and the fixed interface function comprises an int PageBuddy(struct page*) function of the operating system.

\* \* \* \* \*